US012246353B2

(12) United States Patent
Vine

(10) Patent No.: US 12,246,353 B2
(45) Date of Patent: Mar. 11, 2025

(54) SLACK SEPARATION APPARATUS AND METHOD

(71) Applicant: ISHIDA EUROPE LIMITED, Birmingham (GB)

(72) Inventor: Lee Vine, Poole (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 135 days.

(21) Appl. No.: 17/801,037

(22) PCT Filed: Feb. 18, 2021

(86) PCT No.: PCT/GB2021/050390
§ 371 (c)(1),
(2) Date: Aug. 19, 2022

(87) PCT Pub. No.: WO2021/165673
PCT Pub. Date: Aug. 26, 2021

(65) Prior Publication Data
US 2023/0106762 A1 Apr. 6, 2023

(30) Foreign Application Priority Data
Feb. 20, 2020 (GB) ..................................... 2002391

(51) Int. Cl.
*B07B 13/16* (2006.01)
*B07B 1/04* (2006.01)
*B65B 1/06* (2006.01)

(52) U.S. Cl.
CPC ................ *B07B 13/16* (2013.01); *B07B 1/04* (2013.01); *B65B 1/06* (2013.01)

(58) Field of Classification Search
CPC .. B07B 1/04; B07B 1/28; B07B 13/16; B65B 1/06
See application file for complete search history.

(56) References Cited

U.S. PATENT DOCUMENTS 224,341 A * 2/1880 Koplin ...................... B07B 1/18 209/258
235,361 A * 12/1880 Hudson ................. F24B 15/007 209/259
(Continued)

FOREIGN PATENT DOCUMENTS

CN 206373522 U 8/2017
CN 206567199 U 10/2017
(Continued)

OTHER PUBLICATIONS

English Translation; KR 101238705 B1; Inv: Kang; Pub. Date: Mar. 4, 2013 (Year: 2013).*
(Continued)

*Primary Examiner* — Joseph C Rodriguez
(74) *Attorney, Agent, or Firm* — SQUIRE PATTON BOGGS (US) LLP

(57) ABSTRACT

There are provided hoppers for separating slack from a mixture of product and slack, and systems and method using such hoppers. Each hopper comprises: an internal gate configured to prevent the passage of product therethrough, but to allow the passage of slack therethrough; and, an external gate configured to prevent the passage of product and the passage of slack therethrough; the internal gate and the external gate being moveable between respective open and closed positions; the hopper configured such that: when the internal gate and external gate are in their respective closed positions and the mixture is introduced into the hopper, product is retained by the internal gate whilst slack passes through the internal gate and is retained by the external gate; and, when the external gate and internal gate are each in their respective open positions, product may exit the hopper along a first path.

17 Claims, 9 Drawing Sheets

(56) References Cited

U.S. PATENT DOCUMENTS

| | | | | |
|---|---|---|---|---|
| 2,707,558 | A | 5/1955 | Dyer | |
| 4,411,778 | A * | 10/1983 | Venable | B07B 1/46 209/314 |
| 9,233,397 | B1 | 1/2016 | Johnson | |
| 10,471,399 | B1 * | 11/2019 | Hellbusch | B01F 35/71731 |
| 2009/0255857 | A1 | 10/2009 | Borger et al. | |
| 2011/0313566 | A1 * | 12/2011 | Kim | B65B 39/002 221/206 |
| 2022/0001422 | A1 * | 1/2022 | Bron | B07B 13/05 |

FOREIGN PATENT DOCUMENTS

| | | | |
|---|---|---|---|
| CN | 110773423 | A | 2/2020 |
| EP | 1380510 | A1 | 1/2004 |
| EP | 2940438 | A1 | 11/2015 |
| JP | 2002-59242 | A | 2/2002 |
| KR | 101238705 | B1 | 3/2013 |

OTHER PUBLICATIONS

Combined Search and Examination Report under Sections 17 and 18(3) issued in Great Britain Patent Application No. GB2002391.7 dated Aug. 7, 2020.

International Search Report and Written Opinion of the International Searching Authority issued in PCT International Application No. PCT/GB2021/050390 mailed Jun. 1, 2021.

Notice of Reasons for Refusal dated Aug. 27, 2024 issued in corresponding Japanese Patent Application No. 2022-549782 with an English-language machine translation thereof.

* cited by examiner

SLACK SEPARATION APPARATUS AND METHOD

CROSS-REFERENCE TO RELATED APPLICATIONS

This application is a national-stage filing under 35 USC 371 (c) of International Application No. PCT/GB2021/050390, filed Feb. 18, 2021, which claims priority to, and the benefit of. Great Britain Patent Application No. GB2002391.7 filed Feb. 20, 2020, the entire contents of each of which are herein incorporated by reference in their entirety for all purposes.

FIELD

The present disclosure relates to devices, systems and methods for separating excess slack out of a product stream that comprises a mixture of product and slack. For example, the slack could be a food product coating such as sugar for sugared sweets, breadcrumbs for breaded products or seasoning for savoury snacks.

More specifically, aspects of the invention relate to an improved hopper design and systems and methods using said hoppers. The apparatuses and methods according to the invention are particularly well suited for use in the food packaging industry.

BACKGROUND

Some products are packaged together with additional material, which will be referred to herein as slack. Slack, which is generally of a substantially solid or liquid form, may be mixed with solid product before the mixture is portioned into packaging. Where slack is substantially solid, its dimensions are significantly smaller than the dimensions of the product itself, often being at least five times smaller than the dimensions of the product and more typically at least an order of magnitude smaller (i.e. ten times smaller). For example, the slack may be in the form of powder or particulates.

Slack may be included in product packaging to protect the product in some way, for example from degradation due to exposure to certain chemicals or due to motion of the product within its packaging. Alternatively or additionally, slack may be included to enhance the product in some way, for example food products may be provided with loose coatings of sugar, breadcrumbs or herbs to improve their taste, texture and/or appearance. Alternatively or additionally, slack may be created during processing of a product before packaging, for instance, products such as potato chips or crisps may crumble or break to form slack in the form of crumbs.

Furthermore, in some processes (for example coating processes) it may be necessary to mix a higher ratio of slack to product than is desired in the final packaged product, for example to ensure an even coating can be achieved. This presents a problem however, of how to separate excess slack from the product before packaging.

However, for some products it is not desirable for excess slack to be allowed to float freely within the packaging. For example if excess breadcrumbs are floating in the packaging of a breaded food product intended for oven cooking then that excess slack could end up burning on to the oven tray. Separation of excess slack prior to packaging helps to solve these problems.

A further problem can arise where a mixture of product and slack is dropped into packaging, which is subsequently sealed towards its upper end. If the slack falls at a slower rate than the product, for example where the product is a jelly sweet and the slack is a sugar coating, the seal quality may be compromised by slack (sugar) trapped within the seal. The sealing step can be delayed to allow the slack to settle before sealing so as to reduce the occurrence of this problem, but this approach slows processing speed and reduces output of packaged products.

Excess slack may also collect in or adhere to product handling machinery. This may result in the machinery jamming. Equally, the product handling machinery produces a food product, slack which is stuck in machinery for long periods may spoil or attract pests, endangering to public health.

Therefore, there is a need for an alternative method and/or apparatus for separating excess slack from product streams, which preferably contributes to solving one or more of the problems discussed above.

SUMMARY

The claimed invention provides improved devices, systems and methods for removing slack from a product stream. Specifically, devices and systems according to the invention comprise hoppers which may be used to store, weigh and discharge product with reduced levels of slack. For instance, when used in the food industry the claimed invention is suitable for (but is not limited to) separating: loose sugar from sugared sweets; excess flavouring and crumbs from crisps or chips; breadcrumbs from breaded products; and excess marinade from raw meat products.

As used herein, "slack" will be understood to comprise a liquid and/or solids having dimensions that are significantly smaller than the dimensions of products (e.g. food products) within a product stream. As such, solid slack or the solids within slack comprising both liquid and solids may be separated or distinguished from the products on basis of size. For example, solid slack may be in the form of powder or particulates whereas the products may be significantly larger. Solid slack may have dimensions at least five times, and more typically ten times, smaller than the dimensions of the products in a mixture of product and slack.

According to an aspect of the invention there is provided a hopper for separating slack from a mixture of product and slack, the hopper comprising an internal gate configured to prevent the passage of product therethrough, but to allow the passage of slack therethrough; and, an external gate configured to prevent the passage of product and the passage of slack therethrough; the internal gate and the external gate being moveable between respective open and closed positions; the hopper configured such that: when the internal gate and external gate are in their respective closed positions and the mixture is introduced into the hopper, product is retained by the internal gate whilst slack passes through the internal gate and is retained by the external gate; and, when the external gate and internal gate are each in their respective open positions, product may exit the hopper along a first path.

Removing excess slack from a product stream using such a device increases the reliability of a product handling system and improves the quality of a final product.

Moreover, it will be appreciated that the invention provides a particularly quick and efficient means of removing slack from a product stream. Hoppers according to the invention are particularly space efficient since the component that divides or separates the slack from the product (i.e. the internal gate) may be provided inside a hopper. Moreover, hoppers in accordance with the invention may be easily retrofitted to product handling machinery, replacing existing hoppers that may be unsuitable for separating slack from a product stream.

Additionally, slack may be removed from a product stream whilst product is settling within the hopper and without any significant delay to the discharging of product from the hopper. Therefore, slack may be removed from a product stream without significantly affecting the throughput of the hopper and/or the output of a wider system.

The hopper will separate slack from product if the internal gate and the external gate are each in their respective closed positions—i.e. where both the internal gate is in its closed position and the external gate is in its closed position. When the hopper is in this arrangement the product introduced into the hopper will be retained (i.e. held or caught) by the closed internal gate. In contrast, at least a portion of the slack will pass through the closed internal gate (e.g. under gravity). Therefore, the product which is caught by the internal gate is separated or divided from the slack which has passed through the internal gate.

The slack which passes through the closed internal gate will subsequently be retained or caught by the closed external gate which may sit below the internal gate. Subsequently the separated slack may be collected or discharged for collection separately from the product. The collection of slack may be performed manually (i.e. by hand) or automatically by the device and/or a wider system.

The excess slack separated and collected using the device may be reused, being reintroduced to the production line upstream of the device so as to reduce waste.

The product (and any remaining slack) retained by the closed internal gate may subsequently be discharged or allowed to exit the hopper by opening the internal gate and the external gate—i.e. by moving the internal gate and the external gate to their respective open positions.

The amount of slack removed from a mixture of product and slack by the hopper may depend on the length of time that the mixture spends in the hopper (i.e. the "dwell time" of product in the hopper). Similarly, the proportion of slack removed by the hopper may depend on the specific product and slack in question. For instance, in preferred implementation at least 15% of slack may be removed from the mixture introduced into the hopper, more preferably 25%, more preferably still 50%, more preferably still 75%.

It is particularly beneficial to remove slack from a mixture of product and slack at a hopper in comparison to at other stages of a production line. This is because the product may experience a significant drop or fall into the hopper (e.g. from a product feed device such as a dispersion feeder, screw feeder, conveyor or any other suitable machine). This drop may create substantial amounts of slack as the product hits or collides with the hopper. Therefore, devices according to the invention may remove slack promptly after it is created and before it is transferred to downstream product handling machines or before the product is dispensed into a package of a packaging machine. In particular, it may be desirable to provide a slack removal hopper as the final hopper before the food product is dispensed into a package of a packaging machine. This is because slack is typically created each time the product hits or collides with a surface such as the inside of a hopper. A single slack removal hopper provided as the final hopper before packaging may thereby act to removal all slack at the last instance at which significant slack is created, minimizing the amount of slack in the final packaged product. For example, the slack removal hopper may dispense product along the first path, which may lead directly or indirectly into a package of a packaging machine. For example, the product may fall directly from the hopper into a package, or may be conveyed along one or more funnels or chutes into the package.

The internal gate and/or the external gate may move between their respective open and closed positions by rotation about a hinge (e.g. a respective hinge). Alternatively the gates may slide between their respective open and closed positions.

Preferably, the hopper is configured such that when the external gate is in its respective closed position a second path is provided for slack retained by the external gate to exit the hopper, the second path being different from the first path. As such, slack which is separated from the product by the internal gate is be removed or collected from the hopper via the second path (e.g. through an aperture or slack collection duct defined by the hopper). This removal or collection may occur automatically—i.e. without human interaction. As the second path is different from the first path, slack will not re-enter the product stream and will not interfere with downstream product handling devices. Therefore the reliability of a system comprising the hopper and the quality of products output by this system may be increased.

For instance the hopper may be configured such that slack which exits the hopper along the second path may enter a storage reservoir (or other container). Such a storage reservoir may be emptied periodically or continuously as necessary (e.g. so that slack may be reintroduced into the product line upstream of the hopper).

In some embodiments the second path may be angled relative to and/or laterally offset from the first path. By "angled" it is understood that the second path is skewed from the first path, and extends in a direction which not parallel to the direction in which the first path extends. Nevertheless in alternative examples the separated slack may be discharged or collected from the hopper along the same path as the product (i.e. along the first path), as will be discussed further below.

Preferably a lower end of the external gate comprises a trough, the trough being configured to receive slack when the external gate is in its respective closed position. For instance, slack which is separated from product by the internal gate may fall under gravity to the external gate and accumulate or gather in the trough. The provision of a trough (e.g. a groove or slot) which is formed in or on the external gate simplifies collection and removal of the slack.

Additionally, the trough may help avoid slack being unintentionally ejected from the hopper as the external gate is moved from its open position to its closed position (and vice versa). Therefore, hoppers with such a trough are more effective at preventing the passage of slack to further product handling machinery and may be incorporated into a system of increased reliability.

Preferably the hopper is configured such that when the external gate is in its closed position, slack may travel along the trough and exit the hopper along the second path. For instance, the second path may extend through an aperture or gap in a side wall of the hopper adjacent to the trough when the external gate is in a closed position or through a duct or tube which extends from the hopper. In further preferred examples the device may be configured such that slack may travel along the trough and exit the hopper (e.g. under gravity or suction) when the external gate is in either of its respective open or closed positions.

In some examples a base of the trough may be angled such that slack may travel along the base of the trough under gravity. As such, it will be understood that the base of the trough is not parallel to either a horizontal or vertical axis when in use. Therefore, slack (and especially slack in the form of liquids orfine particles) may flow along the base of the trough and may exit the hopper along the second path. This slack may be easily collected at the lower end of the trough or may continue to flow out of the hopper along the second path (e.g. through a gap or aperture in the hopper or through a slack collection duct defined by the hopper). Nevertheless in further examples the trough may comprise a base which is not angled—i.e. the hopper may comprise a trough with a base that extends in a substantially horizontal direction in use.

Additionally or alternatively, the hopper is configured to connect to a vacuum pump a vacuum pump configured to collect slack which exits the hopper along the second path. In this manner excess slack which has been separated from the product by the internal gate and has been retained by the external gate may be quickly and easily removed from the hopper. For instance, the hopper may be configured such that a suction force from the vacuum pump may be applied at or close to the external gate when the gate in at least its closed position so as to collect slack retained by the external gate.

In preferred configurations the vacuum pump may be configured to connect to a trough formed in the lower end of the external gate as discussed above. In these embodiments slack may travel along the base of the trough and out of the hopper under a suction force provided by the vacuum pump—i.e. the vacuum pump may pull the slack along the through and out the hopper along the second path. Preferably, the vacuum pump is connected to the lower end of a trough with an angled base so that slack which has flowed or travelled along the base of the trough may be easily collected and transferred elsewhere (e.g. reintroduced into the production line upstream).

Alternatively or additionally, the hopper may be configured such that separated slack may be collected manually or may flow from the hopper under gravity. In further examples the hopper may be configured to move the external gate into its open position whilst the internal gate remains closed, such that separated slack may be discharged from the hopper whilst product is retained by the internal gate.

Preferably the hopper is configured to connect to connect to a tube, the second path extending through the tube. Here, the term "tube" refers to a conduit of any shape for conveying the slack away from the hopper, but typically the tube will be cylindrical in cross-section. The tube may be rigid or flexible as required. A "rigid" tube would be one that substantially does not deform when subject to forces associated with use, whereas a "flexible" tube may be deformed or bent when force is applied. A rigid tube may be made of materials such as metal or hard plastics and are relatively easy to clean and typically have a longer life. A flexible tube, on the other hand, may accommodate high levels of vibration or movement of the components of the hopper without breaking or becoming disconnected from the hopper. The flexible tube may be formed of a natural or synthetic rubber (e.g. silicone) or any other suitable material. The tube may be permanently connected to the hopper, but in preferred examples it may be removable or selectively detachable (e.g. for maintenance or cleaning).

In preferred examples, the tube is configured to connect to the external gate. Where the tube is flexible, the upstream end of the flexible tube may move with the external gate as it moves between its open and closed positions and the downstream end may connect to a fixed duct into which the slack is conveyed. Where the tube is rigid, the whole tube may move with the external gate as it moves between its open and closed positions and a duct may be arranged with an opening that matches the path through which the rigid tube moves so that all slack passing through the rigid tube is received by the duct. In embodiments in which the hopper comprises a trough formed a lower end of the external gate, the tube may be configured to connect to or to communicate with the trough. Thus the slack separated by the internal gate and retained by the external gate may travel or flow along the trough and into the tube for removal. In particularly preferred examples slack received in the trough may be removed from the hopper in this manner regardless of whether the external gate is in its open or closed position. Thus slack may be more effectively removed from the hopper without delaying operation of the hopper (i.e. discharge of product by the hopper).

Additionally or alternatively, the hopper may be configured to connect to the vacuum pump via the tube. In other words, the tube may be configured to connect to the hopper at a first end and to connect to a vacuum pump at second end. Thus a suction force from the vacuum pump may be applied to the hopper via the tube such that slack separated by the internal gate may be collected along a second path which extends through the tube.

The tube may be formed integrally with the hopper and/or may be permanently connected to the hopper (e.g. with adhesive). However, in preferred examples the hopper is configured to detachably connect to the tube—e.g. such that the tube may be removed for cleaning or maintenance.

For instance, the hopper may comprise a rigid slack collection duct, wherein the hopper is connected to the tube via the rigid slack collection duct. Thus the hopper may be configured such that the tube can be inserted into the slack connection duct and/or so that the slack connection duct can be inserted into the flexible tube. Hence the tube may be easily and quickly connected to the hopper by simply pushing it onto or into the end of a rigid slack connection duct.

Therefore, the slack connection duct may transfer slack from the hopper to the tube. Slack may exit the hopper along the second path through both the rigid slack connection duct and the tube. The slack connection duct may be formed as a tube or as an open channel (but is not limited to these forms). Alternatively, any other means of connecting the tube to the hopper may be provided.

In further alternative examples the hopper may comprise a rigid slack collection duct through which separated slack exits the hopper and may be collected without the need for a tube guiding the slack away from the hopper. For instance the slack collection duct may directly feed separate slack into a storage reservoir.

In the examples above in which slack may exit the hopper via a second path the internal gate and external gates may be configured to move between their respective open and closed positions simultaneously (e.g. in tandem). For instance, the hopper may be configured such that the internal gate is fixed relative to the external gate. In such embodiments the internal gate and external gate—which are rigidly connected (e.g. by screws, adhesives or welding)—will move in tandem at the same time.

However, this is not essential, and in further examples the hopper may be configured such that the positions of the internal gate and external gate may be controlled separately (such that the external and internal gates may be independently opened and closed). In other words the internal and external gates may be separately articulated.

The hopper may be configured to move the external gate between its respective closed and open positions independently from the internal gate, such that when the external gate is in its respective open position and the internal gate in its respective closed position, slack may exit the hopper in the first direction whilst product is retained by the internal gate. Therefore, excess slack separated from the product by the internal gate may be discharged in the first direction separately (i.e. at different times) from the product by opening the external gate but not the internal gate.

In such embodiments the hopper may be configured to alternate the release of product and excess slack along the first path. In effect excess slack separated from product by the internal gate of the hopper exits the hopper at different times from the product, rather than along different paths.

Further machinery or components may be used to collect slack which travels along the first path. For instance a vacuum pump may be configured to collect the separated slack as it is discharged from the hopper along a first path. Additionally, or alternatively, the first path may pass across or over a filter, mesh, grating, grill, or net comprising a plurality of apertures (e.g. in a regular or irregular array). These apertures may be sized to permit slack to pass therethrough but not to allow product to pass therethrough. Therefore as product and slack pass over the filter the product will continue travelling on the first path whereas slack may be separated, being diverted along a different path to the product.

In further embodiments the device may be switchable (i.e. configured such that it may be switched) between two different modes, wherein in the first mode the external gate and internal gate may move together and a second mode in which the external gate and internal gate may move independently. Thus the hopper may be configured to discharge excess slack along either the first path or the second path.

In preferred embodiments the internal gate comprises one or more apertures, each of the apertures being sized to permit slack to pass therethrough but to prevent the passage of product therethrough. Therefore, the slack may pass through the apertures (i.e. holes or perforations extending entirely through the internal gate), whereas product cannot. Hence product is retained by the internal gate whereas slack is not. Additionally or alternatively, the hopper may be configured such that a gap or aperture is defined between the internal gate and a fixed wall of the hopper, wherein slack may pass through said gap or aperture but product may not.

It will be appreciated that a plurality of apertures may be arranged in a wide variety of layouts across the surface of the internal gate. Furthermore, the apertures may take a wide range of sizes and shapes.

Preferably at least one dimension of the apertures is smaller than a minimum dimension of the product with which the hopper is intended for use. Therefore, product may not pass through the apertures. Equally preferably the dimensions of the apertures are greater than the maximum dimensions of the slack so that slack may pass through the apertures.

For instance, the minimum dimension of each of the apertures in the plane of the internal gate is preferably in the range of 0.1 cm to 1 cm, and preferably within the range of 0.1 cm to 0.5 cm. The term "minimum dimension" is understood as meaning the smallest dimension of the aperture in the plane of the internal gate. For instance, if an aperture is circular, its minimum dimension is the diameter of the aperture. Whereas, if an aperture is elongate, its minimum dimension is its width perpendicular to the direction in which it extends.

The dimensions discussed above are suitable for a broad range of applications, and are particularly well suited for the food packaging industry. For instance, internal gates which comprise apertures having at least one dimension in the range from 1 cm to 0.1 cm are well suited for separating loose sugar from sugared sweets, excess flavourings from crisps and chips, and excess marinade from marinated meat products. Nevertheless apertures with alternative dimensions may be selected for alternative mixtures of product and slack.

In preferred examples the internal gate may comprise a filter, mesh, grating, grill, gauze, sieve or net. As such, the internal gate may comprise a plurality of apertures arranged in a regular or irregular array.

In contrast, the external gate may be formed of continuous sheet material. For instance, the external gate may be constructed of sheet or plate metal without apertures or holes extending through it. Thus the external gate will prevent the passage of both product and slack therethrough. Having said this in alternative embodiments the external gate may comprise a small number of apertures or apertures that have dimensions are sufficiently small that neither slack nor product may pass therethrough.

The internal gate, external gate, and/or any fixed walls of the hopper may be formed of metals such as stainless steel, steel and aluminium, alloys, plastics or composites (although any other suitable material may be used). In preferred examples the gates and walls of the hopper may be constructed from folded stainless steel (but this is not essential).

In preferred examples the surface roughness Ra (i.e. the mean deviation of the surface) of the internal gate, external gate, and/or any fixed walls of the hopper may be less than 10 μm, more preferably less than 5 μm, more preferably less than 2 μm. In particularly preferred examples the surface roughness may be less than 1.6 μm. Materials with low surface roughness may prevent product and/or slack from sticking or adhering to the hopper. Additionally, or alternatively, the internal gate, external gate, and/or any fixed walls of the hopper may be provided with a surface relief configured to reduce friction between the hopper and product and/or slack, so as to prevent product and/or slack from adhering to the surface of the hopper.

In particularly preferred examples the hopper comprises a two opposed internal gates and/or two opposed external gates. By opposed gates we understand that when each of the opposed gates is in a respective closed position the free ends (e.g. the lower ends) of each of the opposed gates will meet or abut, whereas when each of the opposed gates is in its respective open position the free ends will be laterally spaced, defining an opening through which product may exit the hopper (e.g. under gravity). In other words, the two opposed internal gates are configured to close together when each is in its respective closed position, similarly the two opposed external gates are configured to close together when each is in its respective closed position. In effect the hopper is closed by two sequential pairs of "double doors", in the form of the internal and external gates.

Therefore in preferred examples: the internal gate discussed above may be a first internal gate and the external gate discussed above may be first external gate; and wherein the hopper further comprises: a second internal gate configured to prevent the passage of product therethrough, but to allow the passage of slack therethrough, and wherein the first and second internal gates are opposed; and, a second external gate configured to prevent the passage of product therethrough and to prevent the passage of slack therethrough, and wherein the first and second external gates are opposed; the second internal gate and the second external gate being moveable between respective open and closed positions; the hopper being configured such that: when the first and second internal gates and first and second external gates are in their respective closed positions and the mixture is introduced into the hopper, product is retained by the first and second internal gates whilst slack passes through the first and second internal gates and is retained by the first and second external gates; and when the first and second internal gates and the first and second external gates are in their respective open positions, product may exit the hopper along the first path.

The device may be configured to move the first and second internal gates between their open and closed positions substantially simultaneously (i.e. in tandem or at the same time. Similarly, the device may be configured to move the first and second external gates between their open and closed positions substantially simultaneously. Thus the movement of the first and second internal gates may be mirrored and the movement of the first and second external gates may be mirrored.

Each of the first and second internal gates may comprise any of the features of the internal gates discussed above. In preferred examples the first and second internal gates may be substantially identical, being mirrored about a centreline of the hopper (though this is not essential). Similarly, each of the first and second external gates may comprise any of the features of the external gates discussed above, and the first and second external gates may be substantially identical, being mirrored about a centreline of the hopper (though again this is not essential).

Hoppers with opposed gates (so-called "double doors") are particularly well suited for use with sticky product and/or slack (e.g. meat coated with a marinade or sticky sweets). In these examples product and/or slack can adhere or stick to the inside of the hopper. Opposed gates-especially opposed gates which open and close substantially simultaneously-apply large forces to the contents of the hopper preventing product and/or slack from sticking to the inside of the hopper. Therefore, hoppers with these "double doors" may be more consistent more reliable for discharging sticky products.

In some embodiments the hopper may be a weighhopper, pool hopper, booster hopper, timing hopper, output hopper or discharge hopper. Such hoppers are commonly used in computer control weighers and other product handling devices. Thus product handling devices may benefit from the advantages provide by reduced levels of slack in their product line.

According to a further aspect of the invention there is provided a system comprising one or more hoppers in accordance with the previous aspect of the invention. Each of these hoppers may comprise any of the preferable or optional features discussed above.

The system may comprise a vacuum pump connected to a first hopper of the one or more hoppers, the vacuum pump configured to collect slack which exits the first hopper along the second path. Thus the vacuum pump may provide a suction force which removes or pulls slack from the first hopper. In some cases the collected slack may be reintroduced back into the system upstream of the first hopper to reduce waste. The vacuum pump may connect to a plurality of hoppers within the one or more hoppers, and collect slack from this plurality of hoppers. Alternatively, each hopper may be connected to a different vacuum pump.

Additionally or alternatively, the system may comprise one or more vacuum pumps to collect slack which exits the hoppers along their first paths (e.g. by opening the external gate(s) of the first hopper whilst the internal gate(s) are held closed).

The system may further comprise a tube configured to connect to a first hopper of the one or more hoppers, wherein the second path extends through the tube. As such, slack may exit or drain from the hopper through the tube (although this is not essential). Advantages of these tubes are discussed above and these may be provided as rigid or flexible tubes to meet any cleaning or maintenance requirements of the system. Preferably each hopper may be connected to a respective tube.

Preferably the system comprises a weighing system such as a combination weigher, multihead weigher, screw fed weigher, cut gate weigher, linear weigher, or mix weigher. When used with the hoppers discussed above these machines may accurately and quickly output portions of products of a predetermined volume or weight wherein these portions contain reduced levels of slack. The weighing system may comprise a plurality of hoppers, and preferably will comprise a plurality of the hoppers in accordance with the first aspect of the invention. For instance, a weigher may comprise a plurality of the hoppers discussed above arranged circumferentially around, and fed by, a feed device (e.g. a dispersion feeder).

In preferred examples the system comprises a packaging machine, wherein preferably the packaging machine is a bag maker, tray sealer, cartoniser or thermoformer. Consequently a product stream with a reduced proportion of slack that is discharged from the one or more hoppers may be fed into the appropriate receptacle within the packaging machine. Therefore the system may output or produce a packaged product with reduced slack is output by the system.

As mentioned above, it is particularly advantageous to provide the hopper immediately upstream of the packaging machine so as to remove slack at the last step before product is packaged. Therefore, preferably, the hopper is arranged to dispense product along the first path into a package of the packaging machine. As mentioned above, the product may fall directly into a package of the packaging machine and/or the first path may take the product through one or more funnels or chutes before the product enters the package.

Further benefits of systems in accordance with the invention are discussed above with reference to the first aspect of the invention. These systems may comprise any of the preferable or optional features discussed above.

In accordance with a further aspect of the invention there is provided a method for separating slack from a mixture of product and slack, the method comprising:

(a) introducing a mixture of product and slack into a hopper, the hopper comprising an internal gate configured to prevent the passage of product therethrough, but to allow the passage of slack therethrough, and an external gate configured to prevent the passage of product and the passage of slack therethrough, the internal gate and the external gate being moveable between respective open and closed positions;

wherein the mixture is introduced into the hopper when the internal gate and external gate are in their respective closed positions, such that product is retained by the internal gate, and slack is retained by the external gate;

(b) collecting the slack retained by the external gate; and (c) moving the internal gate and external gate into their respective open positions such that product retained by the internal gate exits the hopper via a first path.

This process allows slack to be removed from a product stream. The contents of the hopper that are discharged in step (c) by opening the internal and external gates have reduced levels of slack when compared to the mixture introduced into the hopper in step (a). Therefore, the method is very reliable and provides a product of improved quality. Further advantages of this process are discussed above with reference to the first aspect of the invention.

Preferably collecting the slack retained by the external gate comprises either: allowing the slack retained by the external gate to exit the hopper by a second path, the second path being different from the first path; or, moving the external gate into its respective open position whilst the internal gate remains in its respective closed position such that slack retained by the external gate exits the hopper via the first path.

Therefore, in the first case, excess slack is separated from product by the internal gate within the hopper and is directed out of the hopper (e.g. such that the excess slack maybe collected and reused) along a different path than the product. Whereas, in the second case, the excess slack separated by the internal gate is directed out of the hopper along the same path as the product. In contrast to the previous option the excess slack and product are discharged at different times, the excess slack and the product being separated temporally rather than spatially (as in the previous method where slack and product are discharged from the hopper along different paths). In further examples slack separated by the internal gate and retained by the external gate may be removed from the hopper (i.e. collected) manually.

It will be appreciated that in some embodiments a single device or system may be configured to perform either or both of these process steps. For instance, devices and systems may be switchable (i.e. the device or system may be controlled to switch) between two different modes wherein: in the first mode the device or system may implement the first method; and in the second mode the device or system implements the second method. However, this is not essential.

In preferred examples collecting the slack retained by the external gate comprises operating a vacuum pump to collect slack from the hopper. The vacuum pump may be operated continuously or periodically. For instance, the vacuum pump may be operated concurrently with step (b) in each method where excess slack is discharged from the hopper. Depending on the configuration of the system the vacuum pump may collect slack which exits the hopper along either the first path or the second path.

In further preferred examples the method may further comprise:

(d) moving the internal gate and the external gate to their respective closed positions;

wherein steps (a) to (d) are performed iteratively, and wherein preferably each iteration of step (c) occurs at least 100 ms after the preceding iteration of step (d), preferably at least 200 ms after the preceding iteration of step (d), more preferably at least 300 ms after the preceding iteration of step (d), more preferably still at least 400 ms after the preceding iteration of step (d). This delay may provide time for for slack in the hopper to be separated out before the product is discharged. A larger delay will ensure that the final product has reduced levels of slack and is of a higher quality. However, where the hopper is dispensing product into a package of a packaging machine, it is desirable to ensure that each iteration of step (c) occurs at most 1000 ms after the preceding iteration of step (d), preferably at most 800 ms after the preceding iteration of step (d), more preferably at most 600 ms after the preceding iteration of step (d), most preferably at most 500 ms after the preceding iteration of step (d). Reducing the delay between each iteration helps to maintain overall throughput through the system and this is of particular importance where the hopper acts as a bottleneck by being the hopper that dispenses into package of a packaging machine. A preferred range would be each iteration of step (c) occurring between 200 ms and 800 ms after the preceding iteration of step (d), preferably between 400 ms and 600 ms.

In alternative examples, the hopper may form part of a weigher, such as a computer combination weigher (CCW). In such an example, longer delays may be preferred to ensure a more accurate measurement of the weight of the product. In such examples, multiple hoppers in the weigher may be simultaneously weighing and selectively dispensing amounts of product to form batches of predetermined weight, and so a longer delay will have a smaller impact on the overall throughput of the system and so may be preferred in order to improve slack removal. In such examples, it may be preferred that each iteration of step (c) occurs at least 400 ms after the preceding iteration of step (d), preferably at least 600 ms after the preceding iteration of step (d), more preferably at least 800 ms after the preceding iteration of step (d), more preferably still at least 1000 ms after the preceding iteration of step (d). However, the delay time may be defined to provide a balance between the settling time and the throughput of a device.

The internal gate and external gate may be returned to their respective closed positions substantially simultaneously or at the same time (but this is not essential).

As mentioned above, it would be possible to integrate this hopper into a weighing system and in which case additionally or alternatively, the method may further comprise, following step (c):

(i) obtaining a time series of weight measurements of the contents of the hopper;

(ii) making a determination, based on the weight measurements, that the weight of the contents of the hopper has stabilised;

wherein step c) is only performed once said determination has been made.

Therefore, the weight of the contents of the hopper is monitored, and the contents of the hopper are only discharged when measurement has stabilised—i.e. when the weight of the contents of the hopper is known accurately. For example, weight measurements may be taken continuously or periodically (e.g. every 10 ms). In further examples a weight measurement may be take at least every 0.5 s, preferably at least every 0.25 s, more preferably still at least every 0.1 s, more preferably still at least every 0.05 s. The weight of the contents of a particular hopper could be determined to have stabilised if two or more consecutive measurements are of the same value (e.g. three consecutive measurements), and/or if the difference or range between two or more consecutive measurements is less a predetermined value (e.g. below 1 g, more preferably below 0.5 g, more preferably still below 0.15 g).

The method may further comprise the step of transferring the product that exits the hopper via the first path into an item of packaging, and subsequently sealing the item of packaging. This step may be performed by a bag maker, tray sealer, cartoniser or thermoformer. The item of packaging filled during this step maybe a bag, tray, or carton (although other items of packaging may also be suitable). The final packaged article may have reduced levels of slack and be of improved quality.

In preferred embodiments the above methods may be performed using any of the devices or systems discussed above in reference to the preceding aspects of the invention. Moreover, further optional and preferable features of the methods have been discussed above with reference to the preceding aspects of the invention (i.e. the devices and systems discussed above). Equally, many further benefits of the methods which may be achieved using the methods are also detailed above in relation to the devices and systems.

DETAILED DESCRIPTION

Figure 1A:
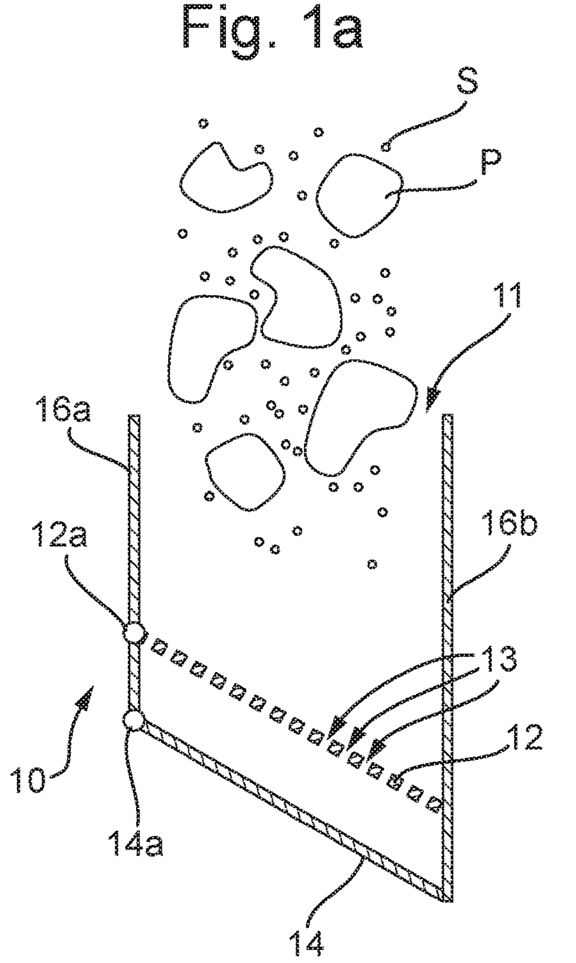
FIGS. 1*a*, 1*b*, 1*c* show schematic cross sections of a device in accordance with the invention; the figures show sequential arrangements of the device as the device performs of a method in accordance with the invention.
Figure 1B:
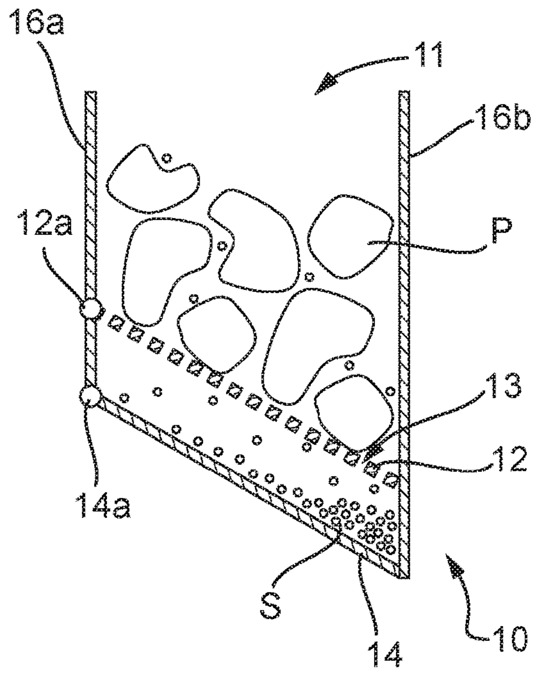
Figure 1C:
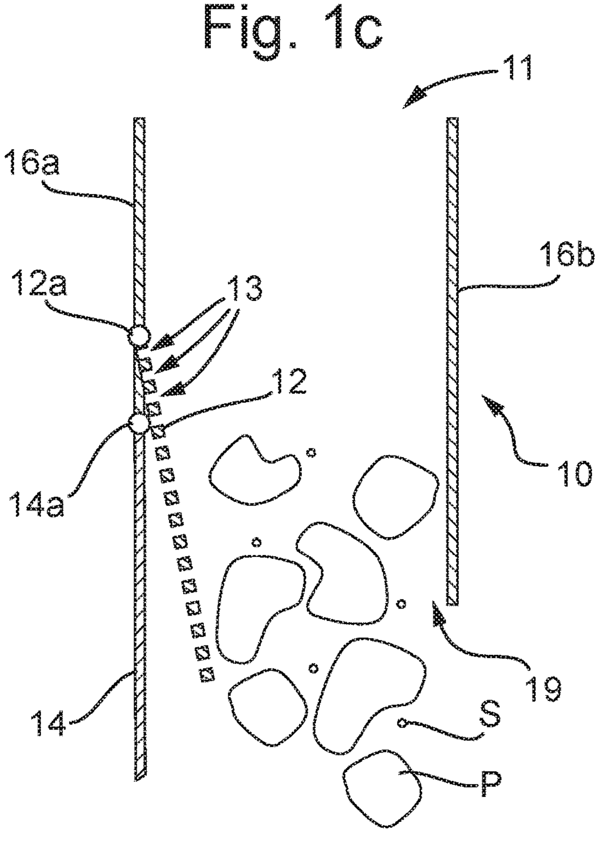

FIGS. 1*a*, 1*b* and 1*c* show a hopper 10 suitable for removing slack S from a mixture of product P and slack S. As shown, slack S is a solid particle (e.g. excess sugar) with significantly smaller dimensions than the product P. In more detail, the dimensions of the slack S shown in FIGS. 1*a* to 1*c* are approximately an order of magnitude smaller (i.e. 10 times smaller) than the dimensions of the products P. However, the hopper 10 is equally suited for use with mixtures containing liquid slack or solid slack having alternative dimensions relative to the product.

The hopper 10 comprises an upper opening 11 through which product P and slack S may be introduced into the hopper 10 (as shown in FIG. 1*a*). The hopper 10 comprises two gates: an internal gate 12; and an external gate 14.

The internal gate 12 comprises a plurality of apertures 13 which extend through the internal gate 12 (i.e. between the two opposed sides of the internal gate). The apertures 13 are sized such that slack S may pass through the apertures 13 (and therefore through the internal gate 12), but product P may not. Therefore, the internal gate 12 is configured to filter or separate slack S from product P. The dimension of each aperture 13 in the plane of the internal gate 12 is greater than the maximum dimension of the slack S and smaller than the minimum dimension of the product P.

In contrast the external gate 14 is continuous, and is formed without any apertures. Neither product P nor slack S may pass through the solid external gate 14. The external gate 14 is positioned lower than the internal gate 12 which is positioned within the hopper 10 (i.e. within the internal volume of the hopper 10 defined by the side walls 16*a*, 16*b* and the external gate 14), such that slack which passes through the internal gate 12 will be retained by the external gate 14.

The internal gate 12 is connected to a first side wall 16*a* of the hopper 10 by a hinge 12*a* about which the internal gate 12 may rotate. The internal gate 12 may be moved between two positions: a closed position as shown in FIGS. 1*a* and 1*b*, where the internal gate 12 extends between the side walls 16*a*, 16*b* of the hopper; and an open position as shown in FIG. 1*c*, where the internal gate 12 hangs from its respective hinge 12*a* such that there is a gap between a distal or free end of the internal gate 12 and the second side wall 16*b* of the hopper 10.

Similarly, the external gate 14 is connected to a first side wall 16*a* of the hopper 10 by a hinge 14*a* about which the external gate 14 may rotate. As with the internal gate 12, the external gate 14 may be placed in two positions: a closed position as shown in FIGS. 1*a* and 1*b*, where the internal gate 14 extends between the side walls 16*a*, 16*b* of the hopper so as to close a lower opening 19 of the hopper 10; and an open position as shown in FIG. 1*c*, where the external gate 14 hangs from its hinge 14*a* such that there is a gap between a distal or free end of the external gate 14 and the second side wall 16*b* of the hopper 10. When the external gate 14 is in its open position (as shown in FIG. 1*c*) a lower opening 19 of the hopper 10 is opened, such that the contents of the hopper 10 may exit the hopper 10.

A process for separating slack S from a mixture of product P and slack S will now be discussed with reference to FIGS. 1*a*, 1*b* and 1*c*. These figures illustrate sequential steps performed using the hopper 10.

Firstly a mixture of product P and slack S is introduced into the hopper 10 whilst the internal gate 12 and the external gate 14 are in their respective closed positions (as shown in FIG. 1*a*).

Having entered the hopper 10, the product P and slack S encounter the internal gate 12. Slack S may pass through the apertures 13 in this internal gate 12, whereas product P may not. Therefore, the product P is retained by the internal gate 12, whereas a proportion of (and preferably substantially all of) the slack S contained in the hopper 10 travels through the internal gate 12. The slack S which passes through the internal gate 12 falls to the lower external gate 14. Hence, the slack S which travels past the internal gate 12 is retained or caught by the underlying external gate 14. The resulting arrangement is shown in FIG. 1*b*.

From FIG. 1*b* it will be seen that small amounts of slack S may remain with the product P retained by the internal gate 12. In many cases it will be preferable to remove large proportions of slack S from a mixture of product P and slack S (e.g. at least 75% of slack or at least 90% of slack). However, in practice it is difficult and/or unnecessary to separate all slack S from product P.

It will be appreciated that the proportion of slack S removed from a mixture using the hopper be controlled by (for instance): varying the length of time the mixture spends in the hopper 10 (i.e. the dwell time of product P); and the size and distribution of apertures in the internal gate 12; and the dimensions of the hopper 10. These parameters may be varied to change the proportion of slack S which is removed from a given mixture of slack S and product P.

Once slack S has been separated from the product P by the internal gate 12, the separated slack S is allowed to exit the hopper 10. The slack S may be automatically or manually collected, and may be reintroduced into the production line upstream of the hopper 10 so as to reduce waste. For instance, the separated slack S retained by the external gate 14 may be removed from the hopper 10 by operating a vacuum pump (not shown), and/or by opening the external gate 14 whilst keeping the internal gate 12 closed to discharge only the separated slack S through the lower opening 19 of the hopper (although other techniques may also be used).

Subsequently, the product P retained by the internal gate 12 may be discharged or dispensed by the hopper 10, as shown in FIG. 1*c*. The remaining contents of the hopper 10 are released by opening the internal gate 12 and the external gate 14 at the same time—i.e. by moving the internal gate and the external gate into their respective open positions. FIG. 1*c* demonstrates this step, showing product P passing through the lower opening 19 of the hopper 10.

Thus the product P (and any remaining slack S) exits the hopper 10 along a first path that extends through the lower opening 19 of the hopper 10. It will be seen that the product mixture discharged by the hopper 10 in FIG. 1*c* has significantly less slack S than the product mixture introduced into the hopper 10 in FIG. 1*a*.

This process may be repeated by returning the internal gate 12 and the external gate 14 to their respective closed positions (shown in FIG. 1*a*) and refiling the hopper 10 with a fresh mixture of product P and slack S.

A delay may be provided between closing the internal and external gates 12, 14 and re-opening the internal and external gates 12, 14. This delay may allow the mixture of product P and slack S to enter the hopper 10, and enables the slack S to be separated and to be collected from the hopper 10. Additionally, the delay may allow the remaining contents of the hopper 10 to settle, and the weight of the contents of the hopper to stabilise. The delay may be, for example, 400 ms or 800 ms.

Additionally, or alternatively, the weight of the contents of the hopper 10 may be periodically or continuously monitored so that the opening of the gates 12, 14 of the hopper 10 is performed once the weight of the hopper 10 has stabilised (indicating that the contents of the hopper 10 have settled and excess slack S has been removed), but not before. For example, weight measurements can be taken of the contents of the hopper 10 on a periodic basis, for example once every 10 ms. The weight of the contents of the hopper 10 could be determined to have stabilised if three consecutive measurements are of the same value, or are within a predetermined range of, for example, 0.15 g.

The product P discharged by the hopper 10 may subsequently be transferred or fed into an item of packaging (e.g. a bag, tray, or carton). The method may further comprise the step of sealing the item of packaging (e.g. using a bag maker, tray sealer, cartoniser or thermoformer).

Figure 2A:
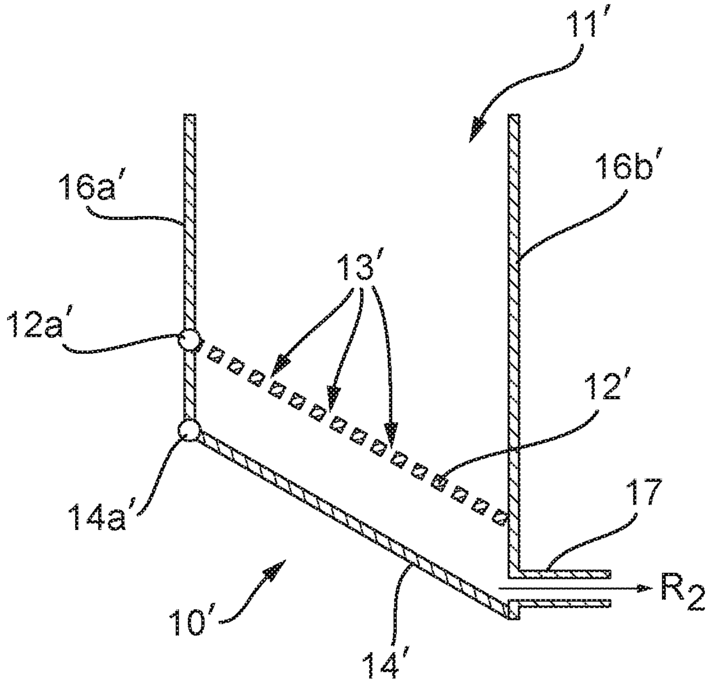
FIGS. 2*a* and 2*b* show schematic cross sections of a further device in accordance with the invention.
Figure 2B:
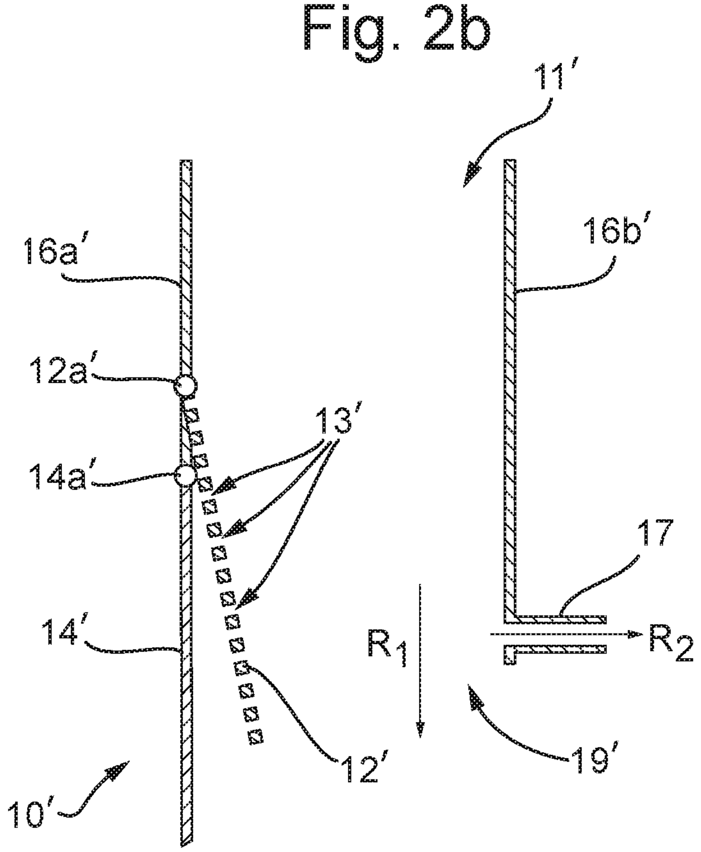

FIGS. 2*a* and 2*b* show a modified version of the hopper 10 of FIGS. 1*a*, 1*b* and 1*c*. This modified hopper 10 is again suitable for separating slack S from product P using the methods described above and shares many features and benefits with the hopper 10 shown in FIGS. 1*a*, 1*b* and 1*c*. Corresponding features of the two hoppers 10, 10' are indicated by reference signs with the prime symbol.

The hopper 10' of FIGS. 2*a* and 2*b* comprises two side walls 16*a*', 16*b*' between which is defined an upper opening 11' through which product and slack may be introduced into the hopper 10'. The hopper 10' comprises an internal gate 12' and an external gate 14', the external gate 14' being positioned below the internal gate 12' (as shown).

The internal gate 12' comprises a plurality of apertures 13', the apertures 13' being sized so that slack but not product may pass through the internal gate 12'. Therefore the internal gate 12' may filter slack out of a mixture of product and slack. In contrast, the external gate 14' is continuous, being formed without gaps or apertures, so that slack may not pass through the external gate 14'.

The internal gate 12' and external gate 14' may rotate about respective hinges 12*a*', 14*a*' connected to a first side wall 16*a*' of the hopper 10'. Therefore, the internal gate 12' and external gate 14' may be moved between respective open and closed positions.

FIG. 2*b* shows the internal gate 12' and the external gate 14' in their respective open positions. In this arrangement a lower opening 19' of the hopper 10' is defined. The contents of the hopper 10' may exit the hopper 10' along a first path extending through this lower opening 19', as indicated by arrow $R_1$.

Unlike the preceding example, the hopper 10' of FIGS. 2*a* and 2*b* comprises a slack collection duct 17 provided in the second side wall 16*b*' of the hopper 10'. This slack collection duct 17 may be used to collect slack that has passed through the internal gate 12' and been retained by the external gate 14'.

Therefore, slack may exit the hopper 10' along a second path (indicated by arrow $R_2$) that is different to the first path, the second path extending through the slack collection duct 17. As will be seen from the Figures, the second path is laterally offset and angled from the first path.

The hopper 10' is configured such that the slack collection duct 17 is located at the lower end of the second wall 16*b*'. Moreover, the external gate 14' is angled relative to the horizontal and slopes towards the slack collection duct 17 when the external gate 14' its closed position (as shown in FIG. 2*a*). Therefore, slack which reaches the closed external gate 14' may flow towards the slack collection duct 17 and out of the hopper 10' along the second path.

A vacuum pump (not shown) may be connected to the slack collection duct 17 (e.g. via a flexible tube) to pull slack from the hopper 10'. However, in alternative examples slack may flow down the second path $R_2$ and through the slack collection duct 17 under gravity and without assistance.

Figure 3:
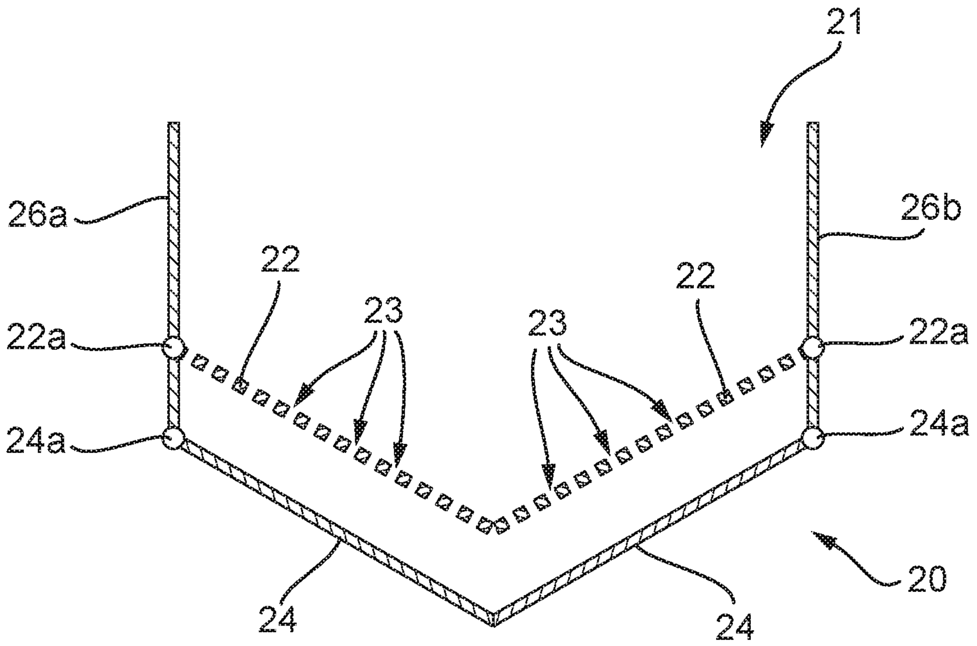
FIG. 3 shows a schematic cross section of a further device in accordance with the invention.

FIG. 3 shows a further hopper 20 comprising a “double door” arrangement. This hopper 20 is well suited for use with sticky products which might adhere to the side walls and gates of “single door” hoppers (such as hoppers 10, 10' shown in FIGS. 1 and 2).

The hopper 20 comprises an upper opening 21 is defined between a pair of side walls 26*a*, 26*b*. Between the side walls are provided a pair of opposed internal gates 22, and a pair of opposed external gates 24 (each shown in a respective closed position in FIG. 3). Each internal gate 22 comprises a plurality of apertures 23 through which slack, but not product, may pass. Each internal gate 22 and each external gate 24 may rotate between a respective closed position and a respective open position about their respective hinge 22*a*, 24*a*.

The internal gates 22 and external gates 24 are shown in their respective closed positions in FIG. 3. As will be seen, the internal gates 22 project from their respective side walls 26*a*, 26*b* such that the free ends of the internal gates 22 meet at a centre of the hopper 20. Similarly, the external gates 24 project from the side walls 26*a*, 26*b* of the hopper 20 such that their free ends meet at a centre of the hopper 20.

In this arrangement slack may be filtered from a mixture of product and slack introduced into the hopper 20. Slack introduced into the internal volume of the hopper 20 may pass through the apertures 23 within the internal gates 22, whereas product may not. This separated slack will subsequently be retained by the underlying external gate 24 which is of a continuous sheet without apertures.

The separated slack may subsequently be removed from the hopper 20 and collected. For instance, the separated slack may be removed from the hopper 20 manually, by opening only the external gates 24 or by operating a vacuum pump (not shown). In further examples a slack collection duct or an aperture in the walls of the hopper 20 may be provided through which slack may exit the hopper 20.

Subsequently, the product remaining in the hopper 20 may be discharged from the hopper 20 by moving the internal gates 22 and external gates 24 to their respective open positions. Hence the hopper 20 may be used to discharge a product mixture with reduced levels of slack—i.e. a mixture from which slack has been removed.

It will be appreciated that the hoppers 10', 20 shown in FIGS. 2 and 3 may comprise any of the preferable or optional features discussed in relation to the hopper 10 shown in FIG. 1 (and vice versa). Equally, the hoppers 10', 20 of FIGS. 2 and 3 may perform corresponding process steps to those described in relation to the hopper 10 of FIG. 1.

A further hopper 30 with "double doors" that is suitable for separating slack from a mixture of product and slack is shown in FIGS. 4*a* to 4*e*.

The hopper 30 comprises a pair of opposed external gates 34. The external gates 34 may each rotate relative to the side walls 36 of the hopper 30 between a respective closed position (shown in FIGS. 4*a*, 4*c* and 4*e*) and a respective open position (shown in FIGS. 4*b* and 4*d*). When each external gate 34 is in its respective closed position the free ends of the external gates 34 meet or abut at the centre of the hopper 30, closing a lower opening 39 of the hopper 30. Whereas, when each external gate 34 is in its open position the external gates 34 are laterally offset or spaced apart, and a lower opening 39 extends between the external gates 34.

The rotation of each external gate 34 is controlled using a respective lever arm 34*b*. Each lever arm 34*b* is fixed to the corresponding external gate 34, and rotatably coupled to the side walls 36 of the hopper 30 by a hinge (not shown) that extends through holes 34*c* in the lever arm 34*b* and the side walls 36 of the hopper 30.

The hopper 30 further comprises a pair of opposed internal gates 32. Each internal gate 32 is fixedly coupled to a corresponding external gate 34 by coupling portions 35 (as seen most clearly in FIG. 4*c*). Each internal gate 32 extends parallel to the external gate 34 to which it is attached (although this is not essential). The connection between the corresponding internal and external gates 32, 34 may be permanent (e.g. the gates 32, 34 may be welded or bonded together using adhesive) or non-permanent (e.g. using threaded fasteners such as screws).

As the internal gates 32 are fixed relative to the external gates 34, each internal gate 32 will rotate with the external gate 34 to which they are attached. Therefore, each internal gate 32 may be moved between a respective open position and a respective closed position by moving the corresponding external gate 34 between its respective open and closed positions.

When the internal gates 32 are in their respective closed positions, the internal gates 32 meet at the centre of the hopper 34. Each internal gate 32 comprises an array of apertures 33 which extend through the internal gate 32. The apertures 33 are sized such that a relatively large product may not pass through the internal gate 32, whereas the relatively small or liquid slack may travel through the internal gate 32. Therefore, the internal gates 32 may act as filters, separating product from slack when each internal gate 32 is in its respective closed position.

As shown, each internal gate 32 comprises a repeating array of oval apertures 32. However, it will be appreciated that apertures with a wide variety of sizes and arrangements may be selected for use in the hopper 30, depending on the mixture of product and slack in question.

Figure 4A:
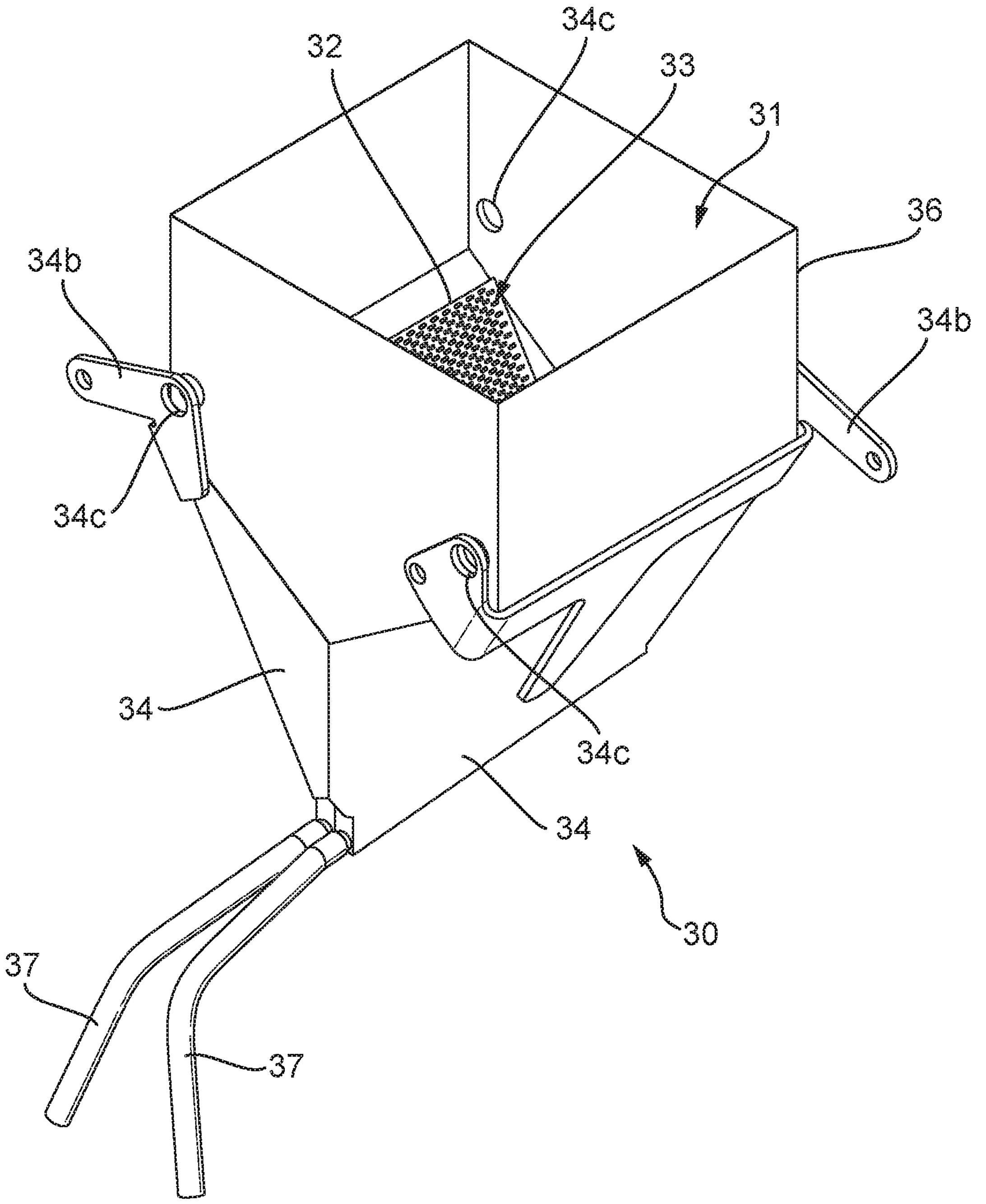
FIGS. 4*a* and 4*b* show perspective views of a further device in accordance with the invention in a closed arrangement and an open arrangement respectively.
Figure 4B:
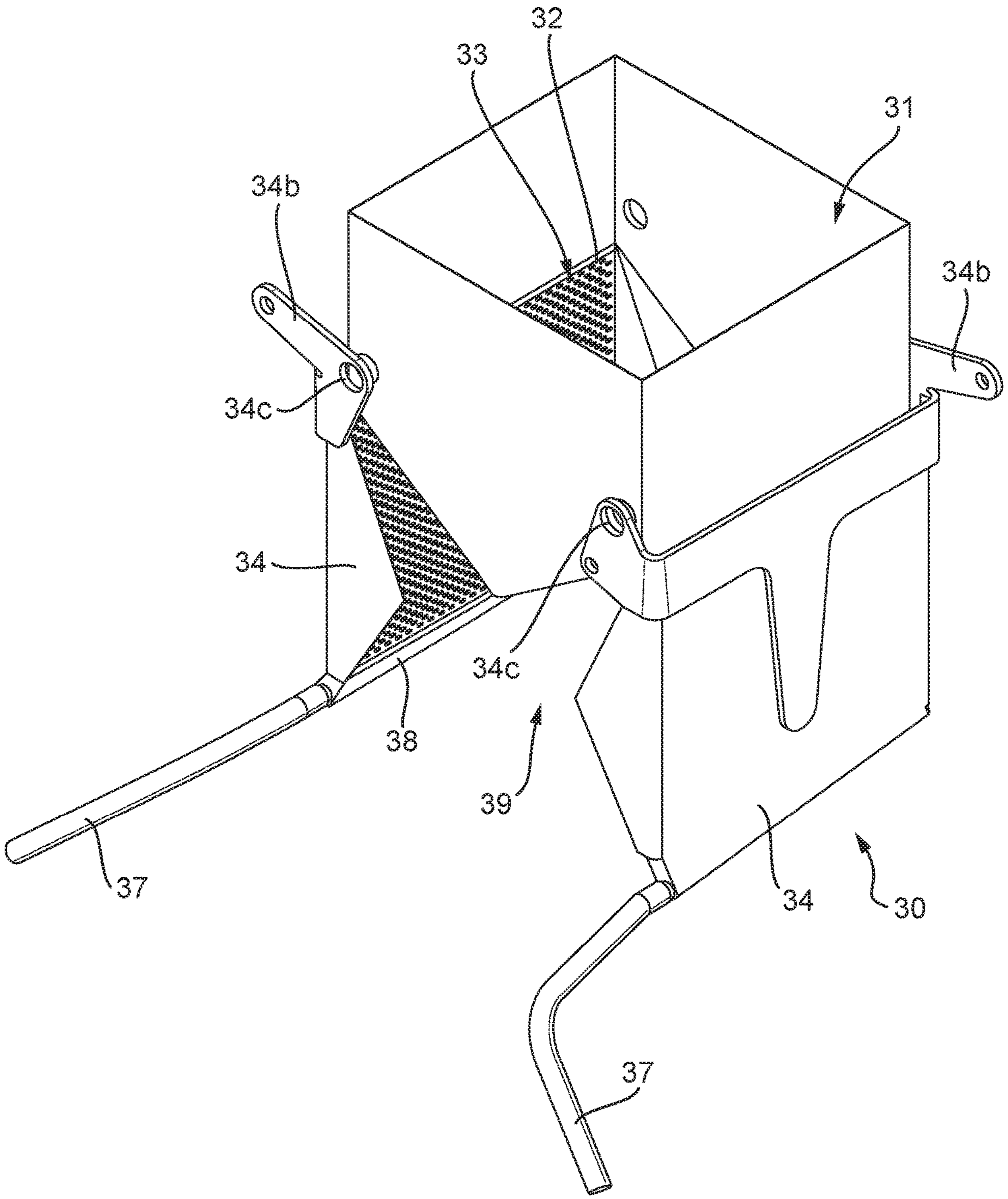
Figure 4C:
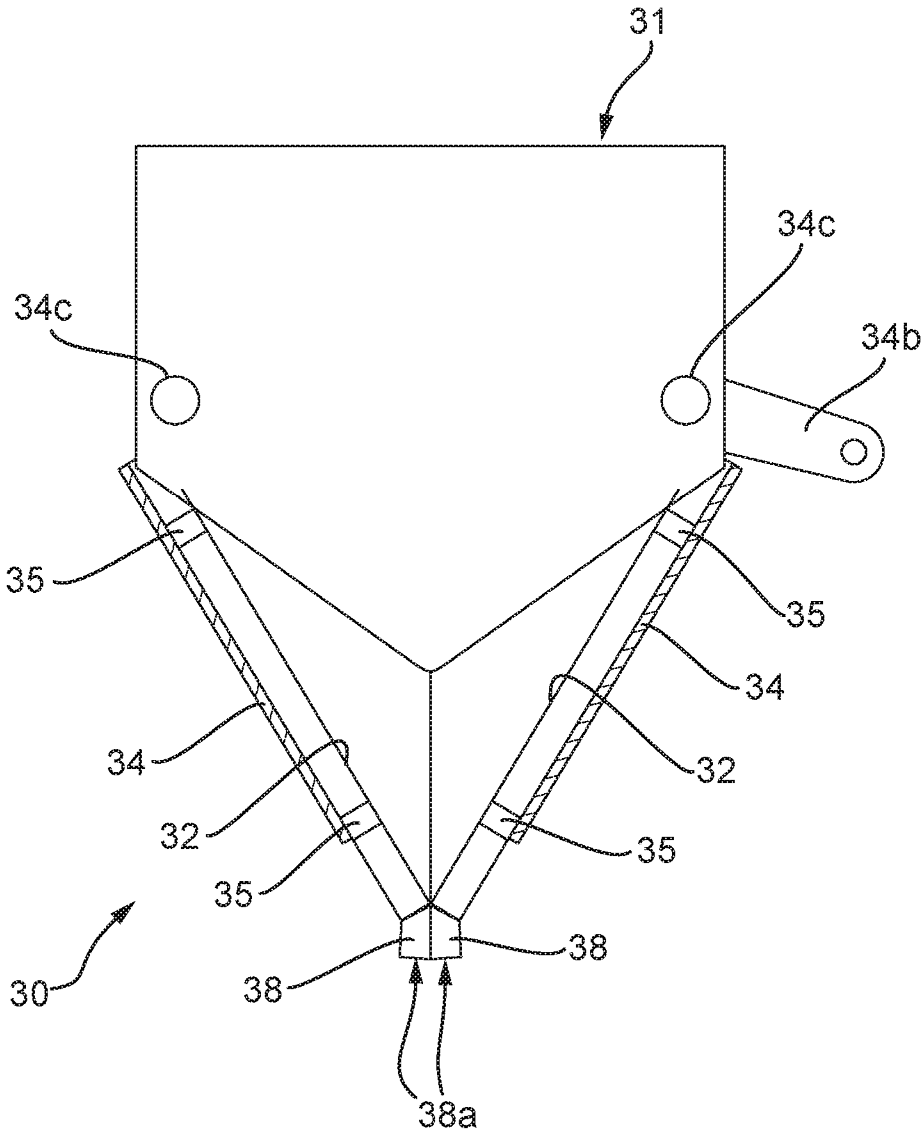
FIG. 4*c* shows a cross section through said device in its closed arrangement.
Figure 4D:
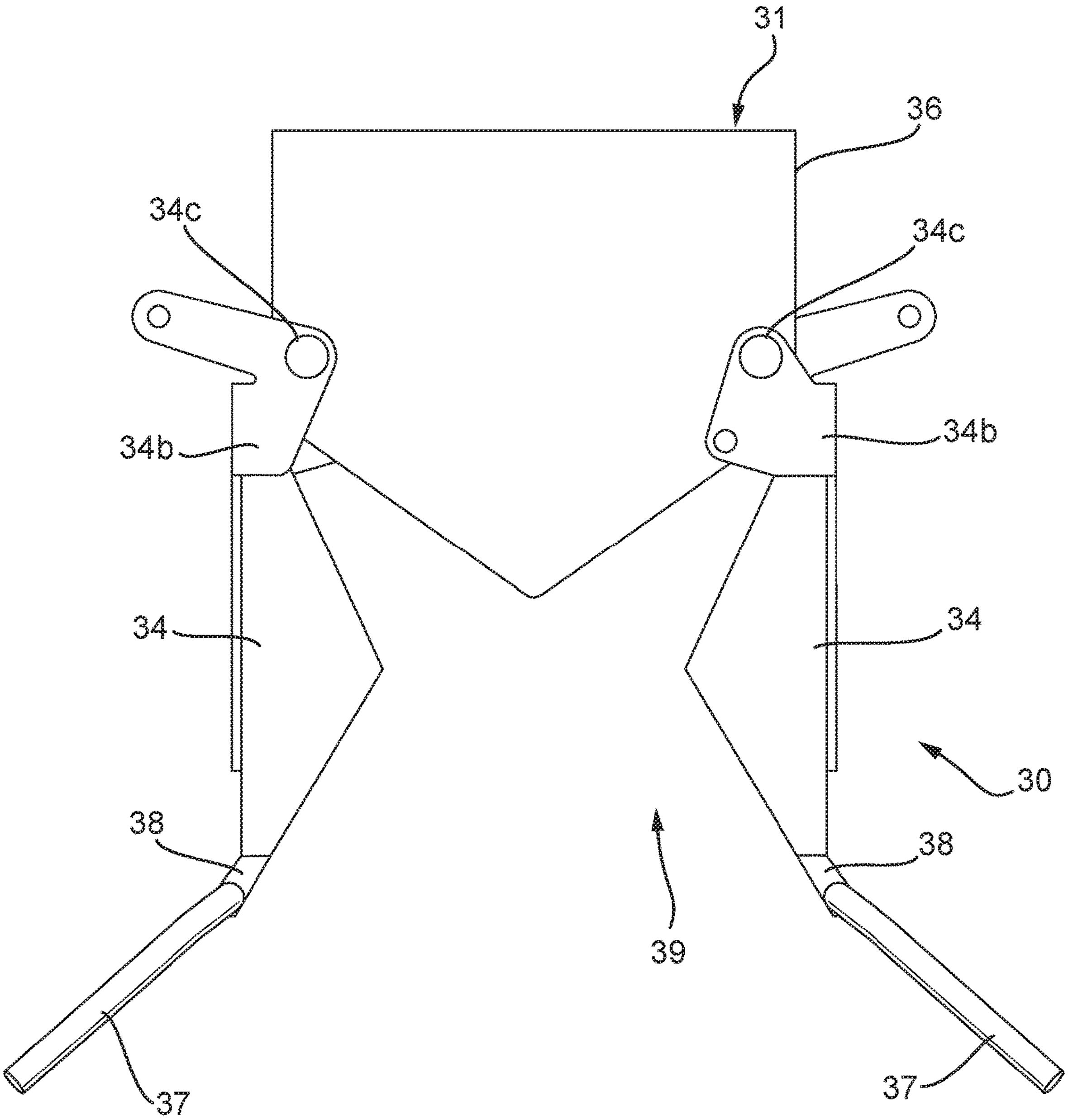
FIG. 4*d* shows a side view of said device in its open arrangement.
Figure 4E:
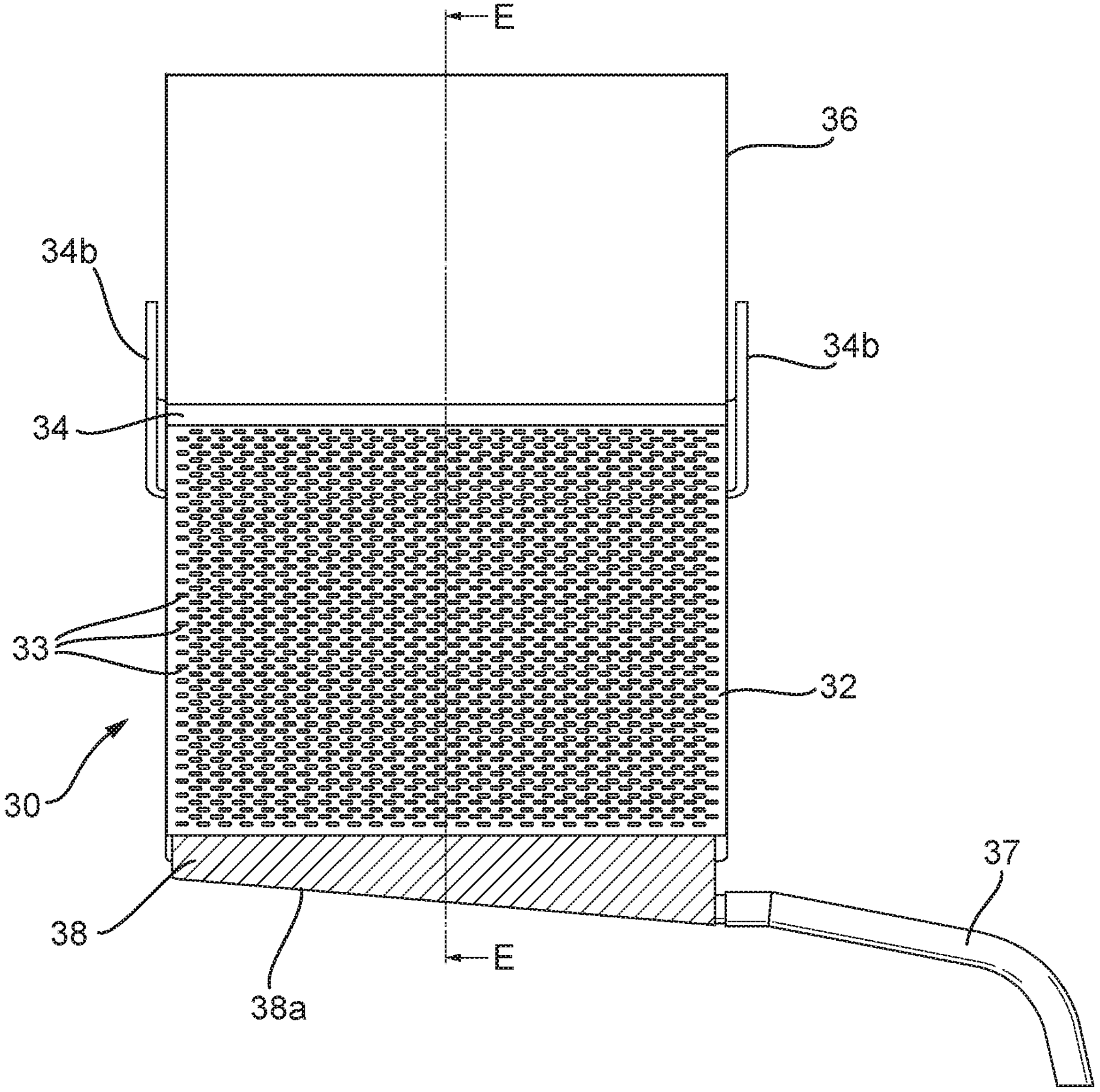
FIG. 4*e* shows a further cross section through said device in its closed arrangement.

When the internal gates 32 and external gates 34 are placed in their closed positions (as shown in FIG. 4*c*, which is a cross section along line E-E of FIG. 4*e*) and a mixture of product and slack is introduced into the hopper 30, product will be retained by the internal gates 32 whereas slack may pass through the internal gates 32 and fall to the underlying external gates 34.

Each of the external gates 34 further comprises a trough 38 (most easily seen in FIG. 4*c*). The troughs 38 are open channels or a duct which may receive slack which has passed through the overlying internal gates 32. In particular, the hopper 30 is configured such that, when the internal and external gates 32, 34 are in their respective closed positions, slack which has passed through the internal gates 32 may fall to the external gates 34 and accumulate in the troughs 38.

When the external gates 34 are in their respective closed positions, the external gates 34 are angled towards their respective troughs 38. Indeed, when each external gate 34 is in its closed position, the external gate 34 is angled downwards from an end proximal to the respective hinge and lever arm 34*b* towards a free end which comprises the trough 38. Since each external gate 34 is angled towards its respective trough 38 when the external gate 34 is in its respective closed position, slack which passes through the internal gates 32 and subsequently reaches the external gates 34 may fall or flow along the surface of the external gates 34 into the troughs 38 (e.g. under gravity).

The base 38*a* of each trough 38 is angled relative to the horizontal, such that the depth of the trough 38 increases along the length of the trough 38. Therefore, slack which accumulates in the trough 38 may flow or travel laterally along the base 38*a* of the trough 38 (e.g. under gravity).

The hopper 30 further comprises a slack collection duct 37 connected to each external gate 34 at its lower edge. More specifically, each slack collection duct 37 connects to the lower end of a corresponding trough 38. Therefore, slack which passes through the internal gates 32 and falls to the external gates 34 will flow or drain along the angled surface of the external gates 34 into the troughs 38, and will subsequently flow or drain to the slack collection duct along the angled base 38*a* of each trough 38. Thus each trough 38 and the corresponding slack collection duct 37 communicate, and slack may exit the hopper 30 along a path (i.e. a second path) that extends from each trough through the corresponding slack collection duct 37. This path is offset and angled relative to the substantially vertical path (i.e. a first path) that the contents of the hopper 30 will take through the lower opening 39 of the hopper when the internal and external gates 32, 34 are moved to their respective open positions.

The passage of slack out of the hopper 30 via the slack collection duct 37 may occur under gravity, by vibrating the hopper and/or slack collection duct 37, and/or by applying a suction force by connecting a vacuum pump (not shown) to the slack collection duct 37.

The slack connection duct 37 may be connected to a flexible tube (not shown), although as described above a rigid tube may also be used. A flexible tube may accommodate change in the position of the slack removal duct 37 as the external gate 34 of the hopper 30 is opened and closed.

For instance, a vacuum pump may be connected to the slack connection duct 37 via a flexible tube. However, this is not essential and in further examples the slack removal duct 37 may itself be formed of a flexible material and/or may directly connect to a vacuum pump or reservoir. In these cases slack may continue to travel along the second path which continues through the flexible tube.

It will be appreciated that in the example shown in FIGS. 4*a* to 4*e*, slack may flow from the troughs 38 into the slack collection ducts 37 and therefore exit the hopper when the external gates 34 are in their respective closed position and in their respective open position. Therefore, excess slack may continue draining from the hopper 30 without delaying the hopper 30 from discharging its remaining contents.

Thus, once a mixture of product and slack has been introduced to the hopper 30, slack will be separated from the product by the internal gates 32. The separated slack will accumulate in the troughs 38 of the external gates and will exit the hopper for collection through the slack collection ducts 37. Subsequently the remaining contents of the hopper may be discharged through the lower opening 39 of the hopper 30 by opening the internal and external gates 32, 34.

The contents of the hopper may only be discharged once the contents of the hopper 30 have had an opportunity to settle. For instance, the internal and external gates 32, 34 of the hopper 30 may only be opened after a predetermined delay has elapsed (e.g. 400 ms, 800 ms or 1000 ms) or when the weight of the contents of the hopper has stabilised (e.g. when the weight measurement(s) from the hopper are constant or fall within a predetermined tolerance).

The discharged product with reduced levels of slack dispensed by the hopper 30 may subsequently be packaged using a packaging apparatus and/or continue to be handled and/or modified by subsequent machinery. This subsequent packaging and product handling operations will be more reliable and of higher quality thanks to the reduced levels of slack.

Any of the hoppers discussed above may be installed in wider product handling system.

For instance, the hoppers may be provided as part of a weighing system and used to accurately discharge known quantities of product with reduced levels of slack. The product handling system may further comprise a packaging apparatus to package the discharged product. Alternatively, the product may continue along a production line and be further modified by subsequent machinery. The subsequent packaging and product handling operations may be more reliable and provide packaged articles of higher quality thanks to the reduced levels of slack dispensed by the hoppers discussed above.

A preferred example of the hopper of FIGS. 4*a* to 4*d* installed in a system according to the invention will now be described with reference to FIG. 5.

Figure 5:
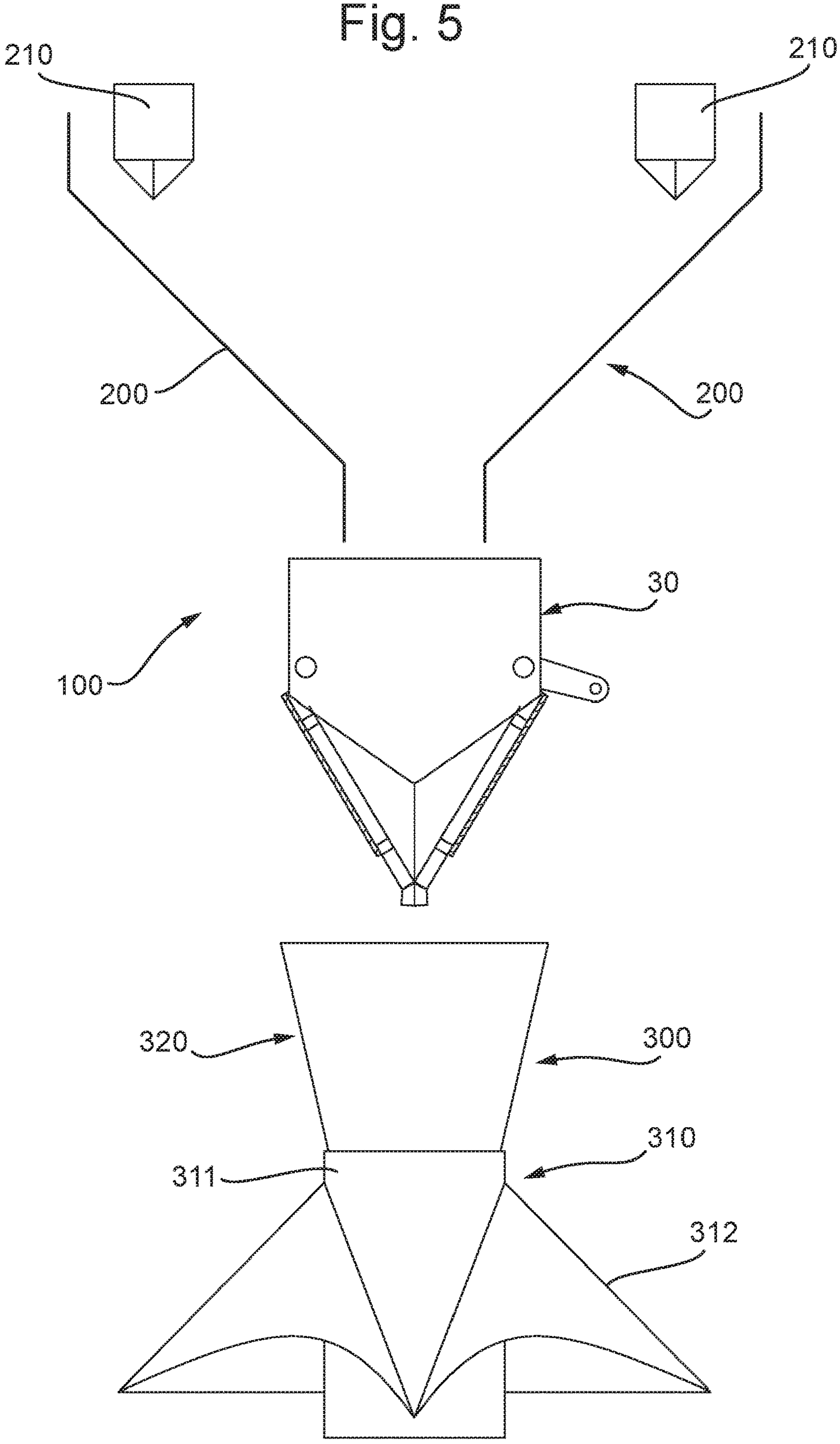
FIG. 5 shows, schematically, the preferred position of the device of FIGS. 4*a* to 4*d* in a system according to the invention.

FIG. 5 shows, schematically, the hopper 30, described above, installed in a system 100 that forms batches of product having a predetermined weight and provides these fixed-weight batches to a packaging machine.

The system 100 comprises a combination weigher 200 located upstream of the hopper 30. An example of a suitable combination weigher would be the RV-Series Multihead Weigher sold by Ishida Europe Limited of 11 Kettles Wood Drive, Woodgate Business Park, Birmingham. B32 3 DB.

Generally, a combination weigher comprises a series of weigh hoppers 210, only two of which are visible in FIG. 5, arranged in a circle about a central axis. Each weigh hopper is fed by a supply, e.g. a product dispersion table, to receive an amount of product. The weights of product in each hopper are continuously monitored and the combination weigher selects any two or more hoppers whose total weight satisfies criteria relating to the weight of a batch of product to be formed and dispenses the product from those hoppers, bringing the product together into a single batch of product having the desired weight. In the present example, the combination weigher 200 is shown as having a funnel 220 that encompasses all of the weigh hoppers 210 for bringing together product dispensed by any two or more weigh hoppers 210 and depositing the product in the slack-separating hopper 30. It should be noted that each weigh hopper 210 could also be formed as a slack-separating hopper according to the invention, although this is not essential.

The slack-separating hopper 30 is thereby provided with a mixture of product and slack whose weight satisfies the predetermined weight criteria for a batch of product. Slack is removed from the hopper 30 by the mechanism described above and this will typically have a negligible effect on the weight of the batch of product. In a case where a significant amount of slack is removed at the hopper 30, it will typically be possible to adjust for this in the combination weigher 200 by forming batches that are overweight by a predetermined amount to compensate for anticipated weight loss as slack is removed. Having received a batch of product, the hopper 30 then dispenses the batch of product into a packaging machine 300 located downstream.

Only a portion of a packaging machine 300 is shown schematically in FIG. 5. An example of a suitable packaging machine for use in the present system would be the Astro Bagmaker sold by Ishida Europe Limited of 11 Kettles Wood Drive, Woodgate Business Park, Birmingham. B32 3 DB.

The packaging machine 300 includes a former 310 which forms a supply film into a cylinder, which cylinder of film is sealed at intervals by a sealer (not shown) to form individual bags. The former 310 comprises an inner forming tube 311 and an outer forming collar 312, which together shape the supply film into a cylinder. The packaging machine also comprises a funnel 320 that connects into the upper opening of the inner forming tube 311 and which feeds product into bags as they are being formed.

In the present system, the hopper 30, having received the product from the weigher 200 and separated out the slack, dispenses the batch of product along the first path, which in this case involves the product falling vertically under gravity as the hopper opens, into the funnel 320 of the packaging machine 300, where it is received in a package, i.e. in a bag as it is formed by the packaging machine. The product will typically be dispensed by the hopper 30 once the lower seal of a bag has been made and once the product is received in the bag an upper seal will be made to seal the bag, which upper seal will thereby form the lower seal of the next bag so that the process can be repeated.

The timing of the hopper 30 opening to dispense product into the packaging machine will typically be controlled by a system controller (not shown) that controls together the weigher 200, the hopper 30 and the packaging machine 300 of the system 100. Typically the system will operate a full cycle in between 100 to 1000 ms and most typically about 500 ms. That is, batches of product will be dispensed by the hopper 30 at regular intervals of approximately 500 ms in order to match the production rate of packages by the packaging machine 300.

While the above system shows the hopper 30 integrated between a weigher 200 and a packaging machine 300, it will be appreciated that this hopper 30 is suitable for use anywhere along the production of a mixture of product and slack. For example, as mentioned, the hoppers could be integrated into the weigher 200, or could be integrated as part of the supply to the weigher 200.

The invention claimed is:

1. A system for separating slack from a mixture of product and slack, the system comprising:

one or more hoppers, wherein each of the one or more hoppers comprises:

an internal gate configured to prevent the passage of product therethrough, but to allow the passage of slack therethrough; and, an external gate configured to prevent the passage of product and the passage of slack therethrough;

the internal gate and the external gate being moveable between respective open and closed positions;

said each of the one or more hoppers configured such that:

responsive to the internal gate and external gate being in their respective closed positions and the mixture being introduced into said each of the one or more hoppers, product is retained by the internal gate whilst slack passes through the internal gate and is retained by the external gate;

responsive to the external gate and internal gate being each in their respective open positions, product may exit said each of the one or more hoppers along a first path; and responsive to the external gate being in the respective closed position a second path is provided for slack retained by the external gate to exit said each of the one or more hoppers, the second path being different from the first path;

wherein the system further comprises:

a weighing system, wherein the weighing system is a combination weigher, multihead weigher, screw fed weigher, linear weigher, or mix weigher; or a packaging machine, wherein the packaging machine is a bag maker, tray sealer, cartoniser, or thermoformer.

2. A system according to claim 1, wherein the second path is angled relative to and/or laterally offset from the first path.

3. A system according to claim 1, wherein a lower end of the external gate comprises a trough, the trough being configured to receive slack responsive to the external gate being in the respective closed position.

4. A system according to claim 3, said each of the one or more hoppers being configured such that responsive to the external gate being in the closed position, slack may travel along the trough and exit said each of the one or more hoppers along the second path.

5. A system according to claim 1, wherein said each of the one or more hoppers is configured to connect to a vacuum pump configured to collect slack which exits said each of the one or more hoppers along the second path.

6. A system according to claim 1, said each of the one or more hoppers configured such that the internal gate is fixed relative to the external gate.

7. A system according to claim 1, said each of the one or more hoppers configured to move the external gate between the respective closed and open positions independently from the internal gate, such that responsive to the external gate being in the respective open position and the internal gate in the respective closed position, slack may exit said each of the one or more hoppers in the first direction whilst product is retained by the internal gate.

8. A system according to claim 1, wherein the internal gate comprises one or more apertures, each of the apertures being sized to permit slack to pass therethrough but to prevent the passage of product therethrough.

9. A system according to claim 8, wherein the minimum dimension of each of the apertures in the plane of the internal gate is in the range of 0.05 cm to 1 cm.

10. A system according to claim 8, wherein the internal gate comprises a filter, mesh, grating, grill, gauze, sieve and/or net.

11. A system according to claim 1, wherein the internal gate is a first internal gate and the external gate is a first external gate; and wherein said each of the one or more hoppers further comprises:

a second internal gate configured to prevent the passage of product therethrough, but to allow the passage of slack therethrough, and wherein the first and second internal gates are opposed; and, a second external gate configured to prevent the passage of product therethrough and to prevent the passage of slack therethrough, and wherein the first and second external gates are opposed;

the second internal gate and the second external gate being moveable between respective open and closed positions;

the hopper being configured such that:

responsive to the first and second internal gates and first and second external gates being in their respective closed positions and the mixture is introduced into the hopper, product is retained by the first and second internal gates whilst slack passes through the first and second internal gates and is retained by the first and second external gates; and responsive to the first and second internal gates and the first and second external gates being in their respective open positions, product may exit the hopper along the first path.

12. A system according to claim 1, wherein said each of the one or more hoppers is a weighhopper, pool hopper, booster hopper, timing hopper, output hopper or discharge hopper.

13. A system according to claim 1, the system comprising a vacuum pump connected to a first hopper of said each of the one or more hoppers, the vacuum pump configured to collect slack which exits the first hopper along the second path.

14. A method for separating slack from a mixture of product and slack, the method comprising:

(a) introducing a mixture of product and slack into a hopper, the hopper comprising an internal gate configured to prevent the passage of product therethrough, but to allow the passage of slack therethrough, and an external gate configured to prevent the passage of product and the passage of slack therethrough, the internal gate and the external gate being moveable between respective open and closed positions;

wherein the mixture is introduced into the hopper responsive to the internal gate and external gate being in their respective closed positions, such that product is retained by the internal gate, and slack is retained by the external gate;

(b) collecting the slack retained by the external gate; and (c) moving the internal gate and external gate into their respective open positions such that product retained by the internal gate exits the hopper via a first path; and (d) moving the external gate into the respective closed position to provide a second path for the slack retained by the external gate to exit said hopper, the second path being different from the first path; wherein the method is performed using the system according to claim 1.

15. A method according to claim 14, wherein collecting the slack retained by the external gate comprises either: allowing the slack retained by the external gate to exit the hopper by the second path or, moving the external gate into the respective open position whilst the internal gate remains in the respective closed position such that slack retained by the external gate exits the hopper via the first path.

16. A method according to claim 14, wherein collecting the slack retained by the external gate comprises operating a vacuum pump to collect slack from the hopper.

17. A method according to claim 14, further comprising the step of transferring the product that exits the hopper via the first path into an item of packaging, and subsequently sealing the item of packaging.

* * * * *